(12) United States Patent
Wong et al.

(10) Patent No.: US 6,282,504 B1
(45) Date of Patent: Aug. 28, 2001

(54) METHOD OF RECEIVING A FACSIMILE MESSAGE

(76) Inventors: David K. Wong, 1166 Happy Valley Ave., San Jose, CA (US) 95129; Nagesh Challa, 978 Lantana Dr., Sunnyvale, CA (US) 94085

( * ) Notice: Subject to any disclaimer, the term of this patent is extended or adjusted under 35 U.S.C. 154(b) by 0 days.

(21) Appl. No.: 09/128,653

(22) Filed: Aug. 4, 1998

Related U.S. Application Data

(62) Division of application No. 08/606,721, filed on Feb. 27, 1996, now Pat. No. 5,819,069.

(51) Int. Cl.[7] .............................. G06F 9/44; G06F 13/10; G06F 13/12
(52) U.S. Cl. .................................. 703/21; 703/6; 703/22; 379/100.01; 358/400
(58) Field of Search ..................................... 358/500, 400, 358/401, 404, 421, 442; 455/557; 379/100.01; 703/21, 22, 6

(56) References Cited

U.S. PATENT DOCUMENTS

| | | | |
|---|---|---|---|
| 4,623,759 | 11/1986 | Todd | 379/79 |
| 4,663,777 | 5/1987 | Szeto | 379/67.1 |
| 4,922,450 | 5/1990 | Rose et al. | 713/310 |
| 5,117,452 | 5/1992 | Callele et al. | 379/93.05 |
| 5,157,711 | 10/1992 | Shimanuki | 379/88.28 |
| 5,182,769 | 1/1993 | Yamaguchi et al. | 379/387 |
| 5,222,040 | 6/1993 | Challa | 365/185.24 |
| 5,291,584 | 3/1994 | Challa et al. | 703/24 |
| 5,410,680 | 4/1995 | Challa et al. | 703/24 |
| 5,414,658 | 5/1995 | Challa | 365/185.06 |
| 5,483,577 | 1/1996 | Gulick | 379/88.07 |
| 5,530,740 * | 6/1996 | Irribarren et al. | 379/88.17 |
| 5,530,855 | 6/1996 | Crump et al. | 713/323 |
| 5,544,234 | 8/1996 | Terajima et al. | 379/100.16 |
| 5,579,377 | 11/1996 | Rogers | 379/74 |
| 5,659,401 | 8/1997 | Yoshida | 358/442 |
| 5,666,397 | 9/1997 | Lamons et al. | 379/34 |

FOREIGN PATENT DOCUMENTS

| | | |
|---|---|---|
| 2 231 237 | 11/1990 | (GB) . |
| 2 272 346 | 5/1994 | (GB) . |

OTHER PUBLICATIONS

OKI Semiconductor, OKI '94 Data Book for Voice Synthesis LSI: MSM6588 ADPCM Solid–State Recorder, 1994, pp. cover, 568–662.

Philips Semiconductors, Data Handbook: 80C51–Based 8–Bit Microcontrollers, 1994, pp. cover, contents, notices, 3, and 33–36.

Philips Semiconductors, Product Specification: CMOS single–chip 8–bit microcontroller 83C51FA/87C51FA, Feb. 11, 1994, pp. 153–154.

Practical Peripherals, Practical Fax Me Operating Manual, 1992: pp. cover, ii–v, 1–1 through 4–11, and A–1 through E–3.

* cited by examiner

Primary Examiner—Kevin J. Teska
Assistant Examiner—Samuel Broda
(74) Attorney, Agent, or Firm—Dorsey & Whitney LLP

(57) ABSTRACT

A low power recording devices permits various flexible power options, including a no-battery option in which the recording device satisfies its entire power requirements from the telephone wall socket and from the RS-232 socket of a computer, and a no-battery option in which the recording device satisfies its entire power requirements from the power source for the mobile telephone. Neither no-battery option exerts a significant additional load on the power source. Voice signals are digitized and stored in low power non-volatile memory. Facsimile signals either are digitized and stored in low power non-volatile memory, or are decoded and stored in low power non-volatile memory. An audio recording and playback capability through an integrated speaker-microphone pair is provided.

3 Claims, 6 Drawing Sheets

METHOD OF RECEIVING A FACSIMILE MESSAGE

CROSS-REFERENCE TO RELATED APPLICATION

This patent document is a divisional of U.S. Ser. No. 08/606,721, filed Feb. 27, 1996 now U.S. Pat. No. 5,819,069, issued Oct. 6, 1998 the entire disclosure of which is considered as being part of the disclosure of this patent document and which is hereby incorporated by reference herein.

BACKGROUND OF THE INVENTION

1. Field of the Invention

The present invention relates to recording apparatus and methods having low power consumption, and more particularly to recording apparatus and method using digital memory and having low power consumption.

2. Description of Related Art

A variety of computer systems are well known, including the popular IBM-compatible type of personal computer system based on the x86 family of microprocessors available from Intel Corporation of Santa Clara, Calif. and other suppliers; the Apple Macintosh personal computer systems available from Apple Computer Inc. of Cupertino, Calif.; and the PowerPC personal computer systems available from Apple Computer Inc. of Cupertino, Calif. These computer systems support a variety of communications devices, including facsimile and telephone answering devices. These communications devices may be external or internal, and may be implemented in chip sets on the motherboard, as expansion boards (add-on cards) compliant with ISA, EISA or PCI specifications, or as add-on cards compliant with the Personal Computer Memory Card International Association specification, or "PCMCIA" specification. When a facsimile or telephone call is received, the communications device answer the line, digitizes the incoming transmission, processes the digitized transmission to obtain a bit map of a document where the incoming transmission is a facsimile, and stores the digital information on the RAM and hard disk of the host.

Mobile telephones are popular because they are immediately accessible to the user. Even so, answering a call on the mobile telephone is at times inconvenient or impossible. Answering machines have been used with mobile telephones to receive and record incoming calls when users are unable to take the calls. In one case, the answering machine is essentially a conventional unit modified to draw its power from the accessories outlet of an automobile and to plug into the peripheral interface port or accessories port of a mobile telephone. In another case, the answering machine is integrated into the mobile telephone. However, neither of these solutions is entirely satisfactory. The external essentially conventional answering machine is cumbersome and consumes a significant amount of power since it uses tape, conventional Flash memory, or a combination for storing the outgoing and incoming messages. The integrated answering machine can only be used with the mobile telephone into which it is built, and hastens depletion of the battery when in use because of its use of conventional Flash memory. Moreover, these answering machines are incapable of receiving facsimile transmissions.

Answering machines are commonly used with stationary telephones, either as separate units or integrated with the telephone, and typically are powered from the power mains. An answering machine powered off of the power mains becomes inoperative when a power failure occurs, even though the telephone to which it is connected remains operational. While an answering machine that is battery powered or has a battery backup will continue to operate in the event of a power failure, this is not a reliable solution since the answering machine will not function if the battery is allowed to discharge through neglect or frequent use.

Devices for recording voice and facsimile are available for use in personal and business computer systems. These devices typically store information on the hard disk of the host computer system. This approach avoids the need for expensive memory dedicated to the recording device, and makes available to the recording device an enormous amount of memory. However, a disadvantage, particularly to consumers and businesses concerned about energy conservation, is that such computer systems must be continuously and reliably powered up, even while not being used for normal office and personal tasks.

Accordingly, a need exists for a recording apparatus and method that provides reliable recording of voice and facsimile and is not reliant on the power mains for its power.

SUMMARY OF THE INVENTION

A recording device in accordance with the present invention is characterized by low power consumption, security against power interruption, reliability, portability and convenience that make it ideal for use in computers, including personal computer systems, and mobile telephony. Advantageously, in one embodiment the present invention records incoming telephone transmissions using only the power from the telephone line to which it is connected, operating to receive and store information even while the host is powered down, powered off, or disconnected. Where the host is a portable computer system, it need not be powered up while communications are in progress, thereby preserving battery power. Advantageously, in another embodiment the present invention draws only negligible power from the accessories port of a mobile telephone or from its battery and reliably operates so long as the host power is available or while the host is being recharged.

These and other advantages are variously realized in the present invention, which in one embodiment is a method of receiving a facsimile message using a host processor, comprising detecting an incoming analog facsimile message from a telephone, digitizing the detected analog message, storing the digitized message in a memory, reading the stored digital message from the memory, and reconstruction the analog facsimile message from the read digital message in the host processor.

BRIEF DESCRIPTION OF THE DRAWINGS

In the drawings, in which like reference characters indicate like parts.

DETAILED DESCRIPTION OF THE PREFERRED EMBODIMENT

Figure 1:
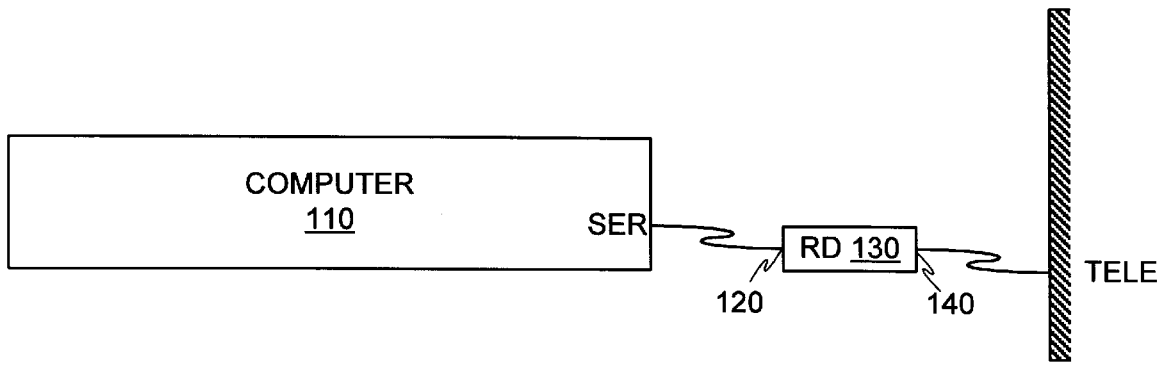
FIG. 1 is a pictorial view of a desktop or portable computer that is plugged into a telephone jack using a recording device in accordance with the present invention.
Figure 5:
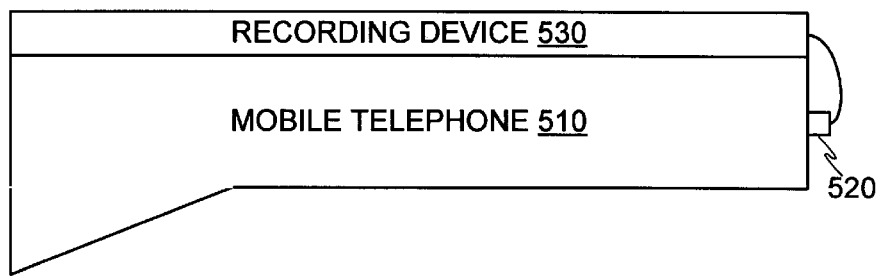
FIG. 5 is a pictorial view of a mobile telephone combined with a recording device in accordance with the present invention.

FIGS. 1 and 5 show different embodiments 130 and 530 of a recording device that preferably records voice and facsimile messages, although the device is readily adaptable to record other information such as computer files. The recording devices 130 and 530 are low power devices assembled from low power memory and other low power components. Components that draw high power or that must be continuously powered, such as tape drives, SRAMs, DRAMS, and the like, are not used in the recording devices 130 and 530. The low power design permits various flexible power options, including a no-battery option in which the device 130 satisfies its entire power requirements from the telephone wall socket and from the RS-232 socket of a computer, and a no-battery option in which the device 530 satisfies its entire power requirements from the power source for the mobile telephone. Neither no-battery option exerts a significant additional load on the power source.

Recording Device for a Computer

FIG. 1 shows an embodiment of a recording device 130 designed for use with a host computer 110 and a telephone line wall socket, preferably an industry standard RJ-11 socket. The computer 110, which illustratively is a personal computer, a workstation, or a laptop computer, preferably includes an industry standard RS-232 serial port. Preferably, the recording device 130 includes a serial output port 120 that is connected to the serial port of the computer 110, and a telephone line-in socket 140 that is connected to the telephone line wall socket. Other types of connectors and cabling may be used if desired, as a variety of suitable connectors and cabling are well known in the art.

In operation, the recording device 130 answers an incoming call immediately when in a no-power mode, and after a user-setable number of rings when in a powered up mode. If the host computer 110 is set up with a fax/modem to respond to incoming calls, it should also be connected to the telephone line either at the line-in socket 140 of the recording device 130 or at the telephone line wall socket using a Y line splitter or other suitable connector. If desired, the recording device 130 may be provided with an additional RJ-11 connector wired in parallel with the line-in connector 140. If the host computer 110 is set up with a fax/modem to respond to incoming calls, its communications software should be set so that when active, the computer 110 answers incoming calls in a fewer number of rings than the recording device 130. If the host computer 110 does not respond to the incoming call within the preset number of rings or if the recording device 130 is in its no-power mode, the recording device 130 picks up the line and detects whether the incoming call is a facsimile transmissions If the incoming call is not a facsimile transmission, an outgoing voice greeting is played and any message received in response to the outgoing greeting is recorded. When one or more voice messages have been received, the recording device 130 generates an indication to which a user responds at his or her convenience by activating the recording device 130 to play back the recorded messages. In one embodiment, the play-back capabilities are integrated into the recording device 130 and are available when the computer 110 is powered-up or when an internal battery or external power source is available. If the incoming call is a facsimile transmission, the recording device reciprocates the handshake signals and establishes a link with the originating facsimile machine. Once the link is established the content signals are recorded, preferably to conserve memory, the handshake signals are not recorded. When one or more facsimile messages have been received, the recording device 130 generates an indication when the computer 110 is powered-up and to which a user responds at his or her convenience by activating the recording device 130 to play back the recorded facsimile messages for viewing on and perhaps other processing by the computer 110.

In one embodiment of the recording device 130 hereinafter referred to as the analog-based embodiment, voice and facsimile transmissions are recorded by treating the incoming signal as an analog signal. The incoming signal is digitized by sampling, and the resulting digital signal is stored in low power non-volatile memory. In another embodiment of the recording device 130 hereinafter referred to as the digital-based embodiment, a voice transmissions is recorded by treating the incoming signal as an analog signal, as explained above. However, a facsimile transmission is recorded by treating the incoming signal as a digital signal. The incoming facsimile signal is decoded, and the resulting digital signal is stored in the low power non-volatile memory.

Figure 2:
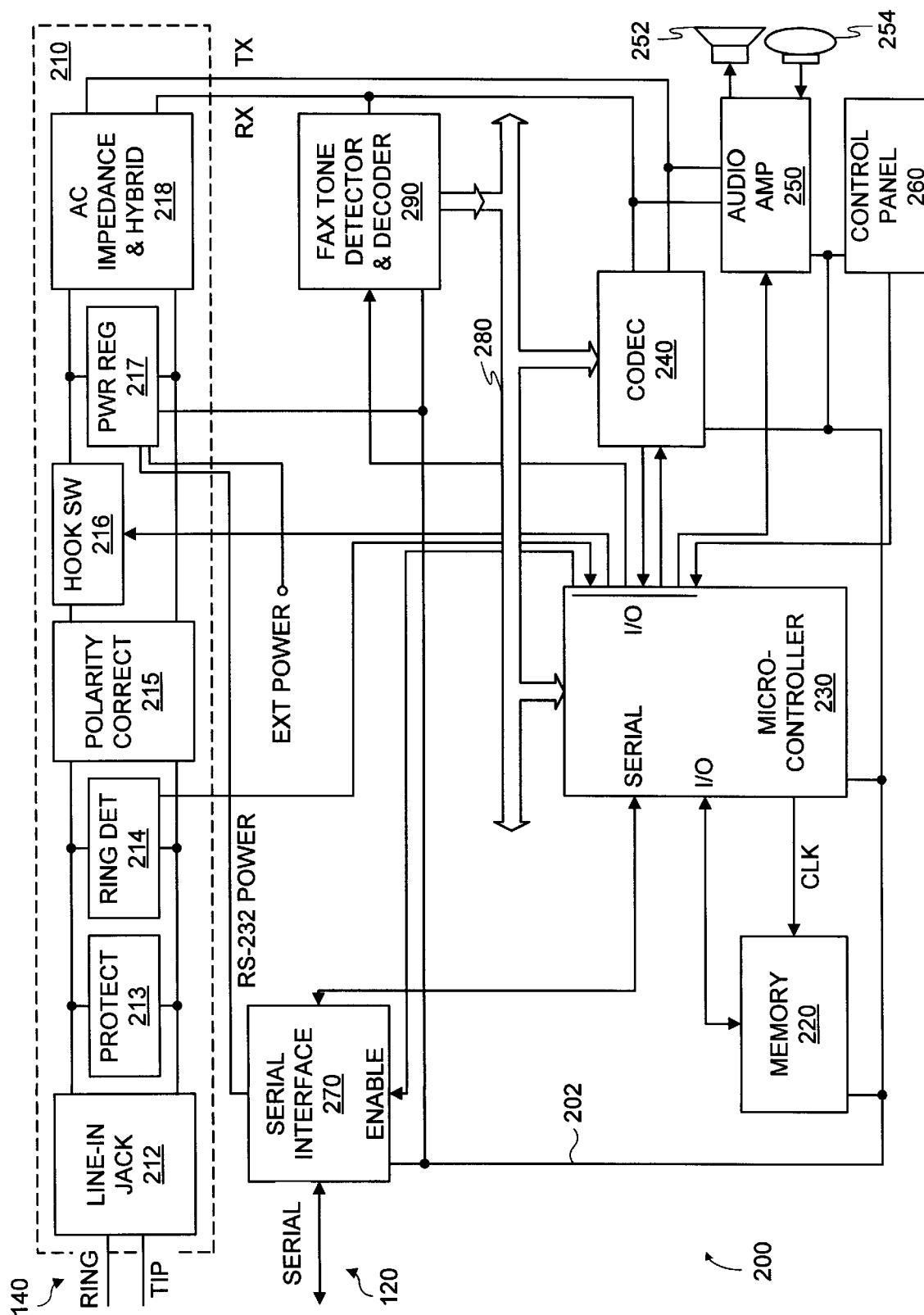
FIG. 2 is a block schematic diagram of an embodiment of a recording device in accordance with the present invention.

FIG. 2 shows an illustrative architecture of a combination voice/facsimile recording device 200 suitable for use in the environment of FIG. 1. Separate voice recording devices (not shown), facsimile recording devices (not shown), and other similar types of recording devices (not shown) also can be realized based on the embodiment of FIG. 2. The various components of the recording device 200 include an external line interface 210, a preferably non-volatile read/write memory 220, a microcontroller 230, a CODEC 240, and a serial interface 270. Optionally, an audio amplifier 250, a speaker 252, a microphone 254, and a user control panel 260 are provided if audio message playback and recording are desired directly from the recording device 200. The recording device 200 is suitable for a variety of applications in a variety of packages, including not only the discrete and stand-alone packages of the recording device 130 shown in FIG. 1, but also integrated into other devices such as add-on facsimile/modem cards for desktop environments, PCMCIA facsimile/modem cards for laptop environments, cartridges for personal data assistant environments, and desktop telephones or the base stations of portable telephones. The recording device 200 may even be integrated into stand-alone devices or add-on cards that provide combination facsimile, voice and answering machine capabilities to provide reliable operation in the event of a power failure or if the device is powered off. Additionally, the recording device 200 may be installed on a computer motherboard.

The telephone interface 210 includes various circuits for interfacing to the telephone line and responding to incoming calls, such circuits being well known to one of ordinary skill in the art The line-in jack 212 preferably is an industry standard RJ-11 jack. A protection circuit 213 protects the recording device 200 from line anomalies. A ring detect circuit 214 detects incoming calls and line pull-ups. A polarity correction circuit 215 corrects for polarity inversions on the telephone line. A power regulation circuit 217 smoothes voltage fluctuations on the telephone line. In addition, the power regulator 217 selects from between multiple possible power sources, viz. the telephone line 140, the powered pin of the RS-232 connector 120, and an external power source such as a battery (which may be mounted internally in the case containing the recording device 200) or an AC power converter, and adjusts the voltage level if necessary. Power regulators for other embodiments may perform a subset of these functions or additional functions, as required by the nature of the power sources used. A hook switch 216 connects the recording device 200 to the line to answer a call. An AC impedance & hybrid circuit 218 applies a proper load to the telephone line and performs echo cancellation of voice and facsimile signals.

A fax/modem tone signal detector and decoder 290 detects and decodes control messages carried by the audio tones generated by originating facsimile machines, the image content itself being stored as a digitized analog signal. In the digital-based embodiment of the recording device 200, the detector and decoder 290 additionally decodes the image content contained in the analog facsimile signal.

The RAM memory 220 stores digital data obtained from processing by the recording device 200 of incoming transmissions. The RAM memory 220 is preferably a low power, re-writable, and non-volatility memory such as that described in U.S. Pat. No. 5,414,658, issued May 9, 1995 to Challa or in U.S. Pat. No. 5,291,584, issued Mar. 1, 1994 to Challa and Gannage, which are incorporated herein by reference in their entirety. A variety of suitable memory array elements are known in the art, and include such elements as conventional Flash and EEPROM, as well as improved designs such as the EEPROM elements described in U.S. Pat. No. 5,222,040, issued Jun. 22, 1993 to Challa, which is incorporated herein by reference in its entirety. The size of the memory 220 depends on a number of factors, ranging from economic factors such as fabrication cost to the structural design of the array element and the fabrication technology used. Based on present processing technology, a cost effective capacity capable of storing about eight facsimile pages is about eight Megabits ("Mb"), although the cost effective capacity is expected to markedly increase as arrays of memory cells based on new technologies such as that described in the aforementioned Challa patent are brought into commercial production. While volatile low-power memory may be used, one will appreciate that the preferably non-volatile characteristic of the memory enables the recording device 200 to retain messages in the event of a full power failure as well as when the recording device 130 is disconnected from both the computer and the telephone line in FIG. 1 without the loss of any data stored therein, even if no internal battery is provided. Disconnection is a particularly frequent occurrence in a portable computing environment, for example.

The memory 220 is read by the microcontroller 230 and its serialized output is furnished on a serial port 120, preferably a RS-232 connector, through a serial interface 270. The serial interface 270 contains line drivers for driving digital data to the serial port of the computer 110, such circuits being well known to one of ordinary skill in the art. While the recording device 200 is particularly suitable for connection to the serial port of a personal computer, other suitable interface and controller circuits well known in the art may be used instead of the serial interface 270 to provide input and output traffic to a parallel port, or to a computer bus such as the ISA, EISA, or PCI bus through, for example, a custom port on an add-on card or a PCMCIA port through a PCMCIA card.

A CODEC 240 performs different functions depending on whether the recording device 200 is an analog-based embodiment or a digital-based embodiment. For the analog based embodiment, the CODEC 240 performs the functions of digitizing the incoming telephone line signal. The digitization is done at a suitable sampling rate which is determined based on the baud rate of the incoming data, and on the memory capacity and power budget of the recording device 200. For the digital based embodiment, the CODEC 240 performs the functions of detecting and decoding amplitude and phase changes in the incoming analog signal, and providing the decoded data at its output. A suitable CODEC is the voice controller type MSM6588, available from Oki Semiconductor, Inc. of Sunnyvale, Calif., or from Oki Electric Industry Co., Ltd. of Tokyo, Japan.

The recording device 200 includes a dedicated microcontroller 230 which controls all major operations, including handshaking and data formatting. As shown in FIG. 2, the microcontroller 230 provides a clock signal to the memory 220 from a clock port. The microcontroller 230 also provides control signals to the serial interface 270, the hook switch 216, the fax tone detector and decoder 290, the CODEC 240, and the audio amplifiers 250 through respective I/O lines. The microcontroller 230 receives status signals from the ring detect circuit 214 and the CODEC 240 through respective I/O lines. The microcontroller 230 furnishes indication signals to and receives command signals from the control panel 260 over one or more I/O lines, depending on the complexity of the control panel 260. Alternatively, if the microcontroller 230 is provided with interrupt ports, one or more of the various status and command signals may be furnished to the interrupt ports; for example, the signal from the ring detect circuit 214 may be furnished to an interrupt port. The microcontroller 230 reads and writes data to the memory 220 over an 1/O line. The microcontroller 230 transmits and receives data to external units through a serial port connected to the serial interface 270. Because speed is not essential in the FIG. 1 application and for purposes of economy and low power, the microcontroller 230 is a relatively simple 8 or 16 bit device such as the type 80C51 8-bit microcontroller available from Philips Semiconductors of Santa Clara, Calif. It will be appreciated that other microcontrollers, microprocessors, controllers, central processing units, functional units, and the like (generally referred to herein as "processors") having similar, equivalent or additional capabilities are known, and may be used in place of the microcontroller 230. For example, some microcontrollers include additional serial ports that may be used instead of an I/O ports for certain purposes, such as for communicating with the memory 220. Other microcontrollers include compression and decompression engines are specifically designed for sophisticated video and/or audio applications. Other types of available microcontrollers include digital signal processing capabilities, or other types of A/D converters such as a Sigma-Delta converter.

The audio amplifiers 250 include an output amplifier driving the speaker 252 to support audio message playback directly from the recording device 200, and a pre-amplifier to support audio message recording directly onto the recording device 200 from a microphone 254. The audio playback and record functions preferably are operational when external power is furnished to the recording device 200, either through a battery or a power converter.

Preferably, the recording device 200 is implemented in as few low power integrated circuit chips as commercially practicable. In the embodiment of FIG. 2, reliance on a battery or converter power source for recording incoming transmissions is avoided by implementing the entire core of the recording device 200, viz. the telephone interface 210, the memory 220, the microcontroller 230, the CODEC 240, and the fax tone detector & decoder 290 (if facsimile capability is desired), in low power chips. The power requirements of these components in combination preferably is limited to the power specifications of the telephone line, viz. about 19 ma at about 3.3 volts. Reliance on a battery or converter power source for communications with a host computer is avoided by implementing the serial interface 270 in combination with the core of the recording device 200 in low power chips having a combined power consumption less that the RS-232 power specification, which requires the ability to assert a level of ±5 volts to ±15 volts into a 3000 to 5000 ohm load. Typical RS-232 drivers are current limited at 5 mA to 15 mA per output. The playback and recording functions of the recording device 200 preferably are disabled unless power from a battery or power converter is available, since the audio amplifiers 250 typically require more power that is available from either the telephone line or the RS-232 connector. The audio amplifiers 250 is available in many forms from a variety of manufacturers; one suitable single chip solution is the type LM4861, available from National Semiconductor Corporation of Santa Clara, Calif.

Figures 3A, 3B:
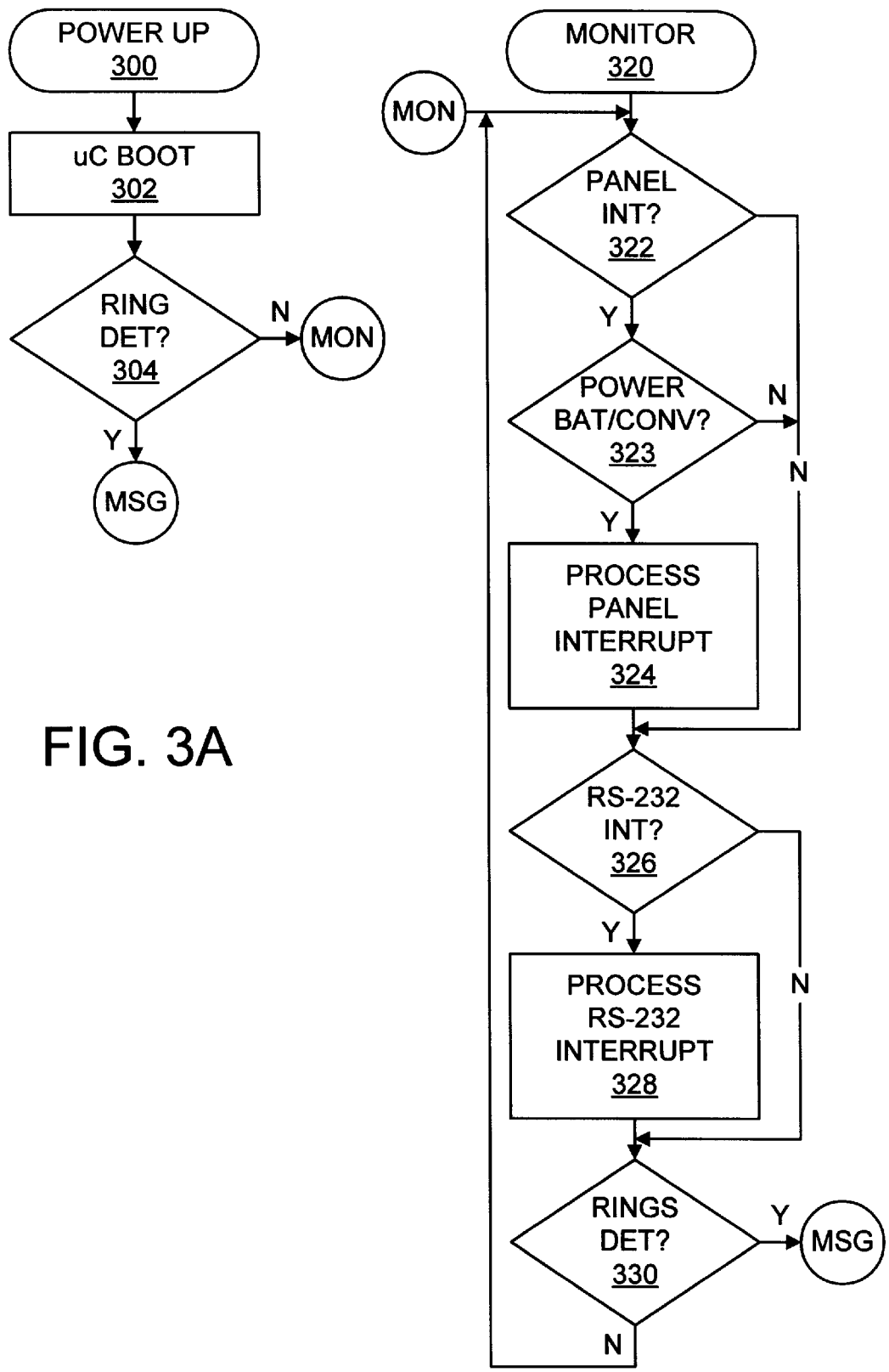
FIG. 3A is a flow chart of a power up routine suitable for a microcontroller used in the recording device of FIG. 2.
FIG. 3B is a flow chart of an monitor routine suitable for a microcontroller used in the recording device of FIG. 2.

FIG. 3 is a flowchart that shows the various operations of the microcontroller 230 FIG. 3A shows a power-up routine. If the recording device 200 is not operating off of a battery or converter, it will have an insufficient amount of power available from the telephone line until a ring occurs and the line is answered. When the telephone line rings, the ring detect circuit 214 responds by turning on the off-hook switch 216, which causes the off-hook power of 3.3 volts at 19 ma to be made available to the power regulator 217. This power is sufficient to power up the microcontroller 230, which executes a boot procedure (step 302) and then checks whether a ring signal has been detected by the ring detect circuit 214 (step 304). If a ring signal has been detected, processing continues with a message routine 340. If a ring signal is not detected, then the power up event is due to power being furnished by an external battery or by the RS-232 port 120. In this event, processing continues with a monitor routine 320.

FIG. 3B shows the monitor routine 320, which is executed when the recording device 200 is powered up by a battery or converter, or through the RS-232 port 120. Preferably, the microcontroller 230 executes the monitor routine 320 at a lower power setting, if supported. One way of operating at a lower power setting is to operate at a lower clock speed. Another way, available when the microcontroller 230 has sufficient interrupt inputs respectively connected to the control panel 260, the RS-232 port 120, and the ring detect circuit 214, is to enter a sleep mode that is disturbed by a signal at one of the interrupt inputs. Regardless, the monitor routine 320 monitors and responds to signals from various components of the recording device 200. One such component is the control panel 260, which provides certain basic user controllable functions such as play, erase, rewind, fast forward, OGM recording, and memo, and controls playback volume. When a hardware command is issued by the control panel 260, it is detected (step 322) and processed (step 324) by the microcontroller 230 provided sufficient power is available from a battery or power converter (step 323).

Another such component is the RS-232 port, which provides user controllable functions generated by the host computer 110. When a software command is issued by the host computer 110, it is detected (step 326) and processed (step 328) by the microcontroller 230 The functions include file transfer commands by which recorded fax messages are transferred to the host computer 110 for processing and display. Additionally, the host computer 110 can provide playback of voice messages by issuing file transfer commands by which voice messages are transferred to the host computer 110 for processing and audio reproduction. If desired, the host computer 110 can also provide software control of the previously mentioned basic functions, and if desired can control many other functions such as receiving station identification, number of rings until answer (not effective unless power is furnished by a battery or converter, or unless the computer 110 is powered up and the RS-232 port power is available), caller ID-based actions, the sampling rate of the incoming transmission (in the analog-based embodiment, if supported by the CODEC used), and the maximum baud rate of the modem. Another such component is the ring detect circuit 214, which generates a status signal when a ring occurs. When a particular number of rings as set by the user is detected (step 330), processing is continued with the message routine 340. Otherwise, the monitor routine 320 is re-executed.

Figures 3C, 3D:
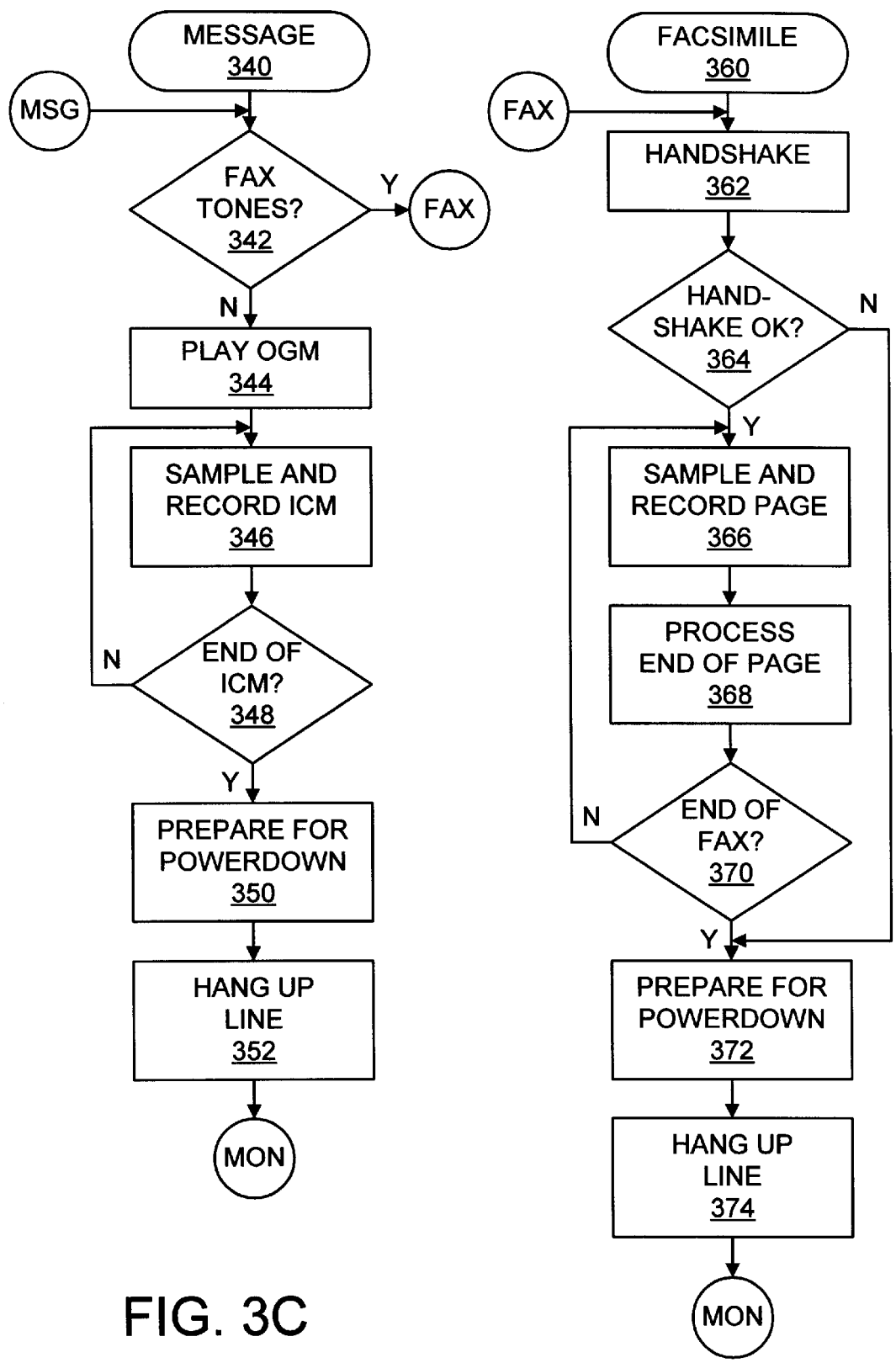
FIG. 3C is a flow chart of a message routine suitable for a microcontroller used in the recording device of FIG. 2.
FIG. 3D is a flow chart of a facsimile routine suitable for a microcontroller used in the recording device of FIG. 2.

FIG. 3C shows a message routine 340, which is executed when a cell is answered. The microcontroller 230 monitors for fax tone signals (step 342), and if none are detected within a fixed period of time determines that the incoming message is a voice transmission. In response, an outgoing message or OGM digitally stored in the memory 220 is accessed by the microcontroller 230, converted in the CODEC 240, and transmitted through the interface circuit 210 to the originating caller (step 344). The caller's incoming message or ICM in response to the OGM is sampled and the resulting digital bit stream is stored in the memory 220 (step 346). When the end of the ICM is detected, typically by a prolonged period of silence or by a hang-up (step 348), the microcontroller 230 prepares for shutdown by completing all pending writes, if any, to the memory 220 from internal RAM or from the CODED 240 (step 350) and then hangs up the line (step 352). If the only power source is telephone line power, that power will fail upon hang up and the recording device 200 will enter into a power off mode so that when power is restored, the power up routine 300 is executed. If another power source is available, the microcontroller 230 remains powered up, and processing continues with the monitor routine 320.

FIG. 3D shows a facsimile routine 360 suitable for the analog-based embodiment of the recording device 200. The facsimile routine 360 is executed when fax tones are detected by the fax tone detector and decoder 290 at step 342. Note that for the analog-based version of the recording device 200, the fax tone detector and decoder need only have the capability of detecting certain facsimile control signals, and is not necessarily provide with the capability of decoding facsimile content signals or the data path connecting it to the system bus 280. The content decoding capabilities and connecting data path are used in the digital-based embodiment of the recording device 200, which is described in association with FIG. 4. The originating facsimile machine and the recording device 200 engage in a handshaking routine, which is well known in the art, to identify one another as facsimile machines, to identify their respective capabilities, and to "train" (step 362). If the handshake is successful (step 364), the originating facsimile transmits a page which is sampled by the CODEC 240 and the resulting digital bitstream stored in the memory 220 (step 366). The microcontroller 230 identifies the end of page code and generates a responsive acknowledgment message to the originating facsimile machine using the CODEC 240 (step 368). Error checking is not done. Subsequent pages are similarly processed, and the number of pages and their addresses in memory are stored by the microcontroller 230 in the memory 220. When the last page is sent, the originating fax sends an "end of facsimile" message. When the end of facsimile message is detected (step 370), or if the handshaking fails (step 364), the microcontroller 230 prepares for shutdown by completing all pending writes, if any, to the memory 220 from internal RAM or from the CODED 240 (step 372) and then hangs up the line (step 374). If the only power source is telephone line power, that power will fail upon hang up and the recording device 200 will enter into a power off mode so that when power is restored, the power up routine 300 is executed. If another power source is available, the microcontroller 230 remains powered up, and processing continues with the monitor routine 320.

A facsimile message stored in the memory 220 by the analog-based embodiment of the recording device 200 preferably is accessed by the host computer 110 and converted into the original analog signal in software using a reverse algorithm based on the algorithm implemented by the CODEC 240. The reconstructed original analog signal is processed in software using a reverse ADPCM algorithm to obtain HDLC packets. The HDLC packets in turn are decoded in software in accordance with the appropriate CCITT specification, preferably using one dimensional data One dimensional data typically is slower dMan two dimensional data, but is preferred in the analog-based embodiment because uncorrected errors within lines, which can occur in the analog-based embodiment of the recording device 200, would propagate errors through the conversion. While transmission errors are ignored in the analog-based embodiment of the recording device 200, the impact on the resulting image typically is negligible.

Figure 4:
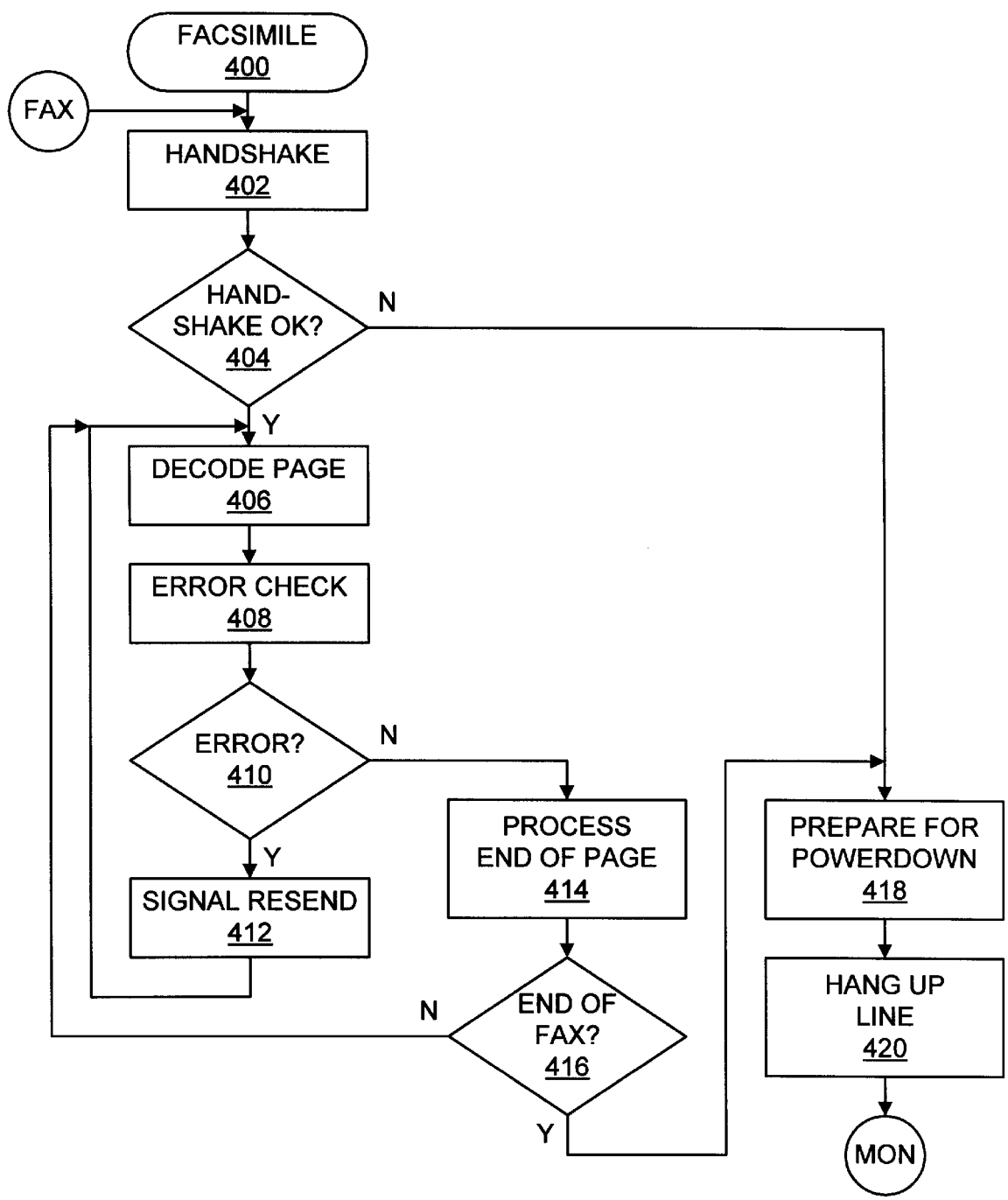
FIG. 4 is a flow chart of an alternative facsimile routine suitable for a microcontroller used in the recording device of FIG. 2.

FIG. 4 shows an alternative facsimile routine 400 suitable for the digital-based embodiment of the recording device 200. The facsimile routine 400 is executed when fax tones are detected at step 342. The originating facsimile machine and the recording device 200 engage in a handshaking routine (step 402). If the handshake is successful (step 404), the originating facsimile transmits a page which is decoded by the fax tone detector and decoder 290 (step 406). Error checking is performed by the microcontroller 230 using well known techniques (step 408). If errors are detected (step 410), the microcontroller 230 and the CODEC 240 generate a page resend signal to the originating fax (step 412), which responds by resending the page. If no errors are detected, the miicrocontroller 230 identifies the end of page code and generates a responsive acknowledgment message to the originating facsimile machine using the CODEC 240 (step 414). Subsequent pages are similarly processed, and the number of pages and their addresses in memory are stored by the microcontroller 230 in the memory 220. When the last page is sent, the originating fax sends an end of facsimile message. When the end of facsimile message is detected (step 416), or if the handshaking fails (step 404), the microcontroller 230 prepares for shutdown by completing all pending writes, if any, to the memory 220 from internal RAM or from the CODED 240 (step 418) and then hangs up the line (step 420). If the only power source is telephone line power, that power will fail upon hang up and the recording device 200 will enter into a power off mode so that when power is restored, the power up routine 300 is executed. If another power source is available, the microcontroller 230 remains powered up, and processing continues with the monitor routine 320.

The analog-based embodiment generally consumes less power in processing than the digital-based embodiment, but more power in sampling. Hence, where power consumption is of primary concern, the choice between the two embodiments depends on the power dissipation of the circuits available to carry out the fax signal decoding and the waveform sampling at the desired frequency. Where error correction is important, the digital-based embodiment is superior.

While a serial technique has been described for communicating the messages stored in the memory 220 to the host computer 110, other techniques may be used as well. In one alternative, useful when the computer 110 has a facsimile/modem capability the stored file may be communicated to the computer 110 using a modem connection. In this embodiment (not shown), the TX output of the CODEC 240 is connected to an RJ-11 line-out emulator, and the microcontroller 230 in conjunction with the CODEC 240 emulate a low speed modem. When the modem settings of the computer 110 match the emulated characteristics, a standard modem file transfer occurs. In another alternative, the keyboard interface of the computer 110 is used instead of the RS-232 port to serially download files from the recording device 200 and provide an alternative power source.

It will be appreciated that the non-volatile character of the memory 220 permits the recording device 200 to be carried anywhere and plugged into any wall socket to record voice and facsimile transmissions, even when a computer is not immediately available. Moreover, when equipped with a battery or converter, the recording device 200 also conveniently serves as a dictation and conference recorder.

Recording Device for a Mobile Telephone

Figure 6:
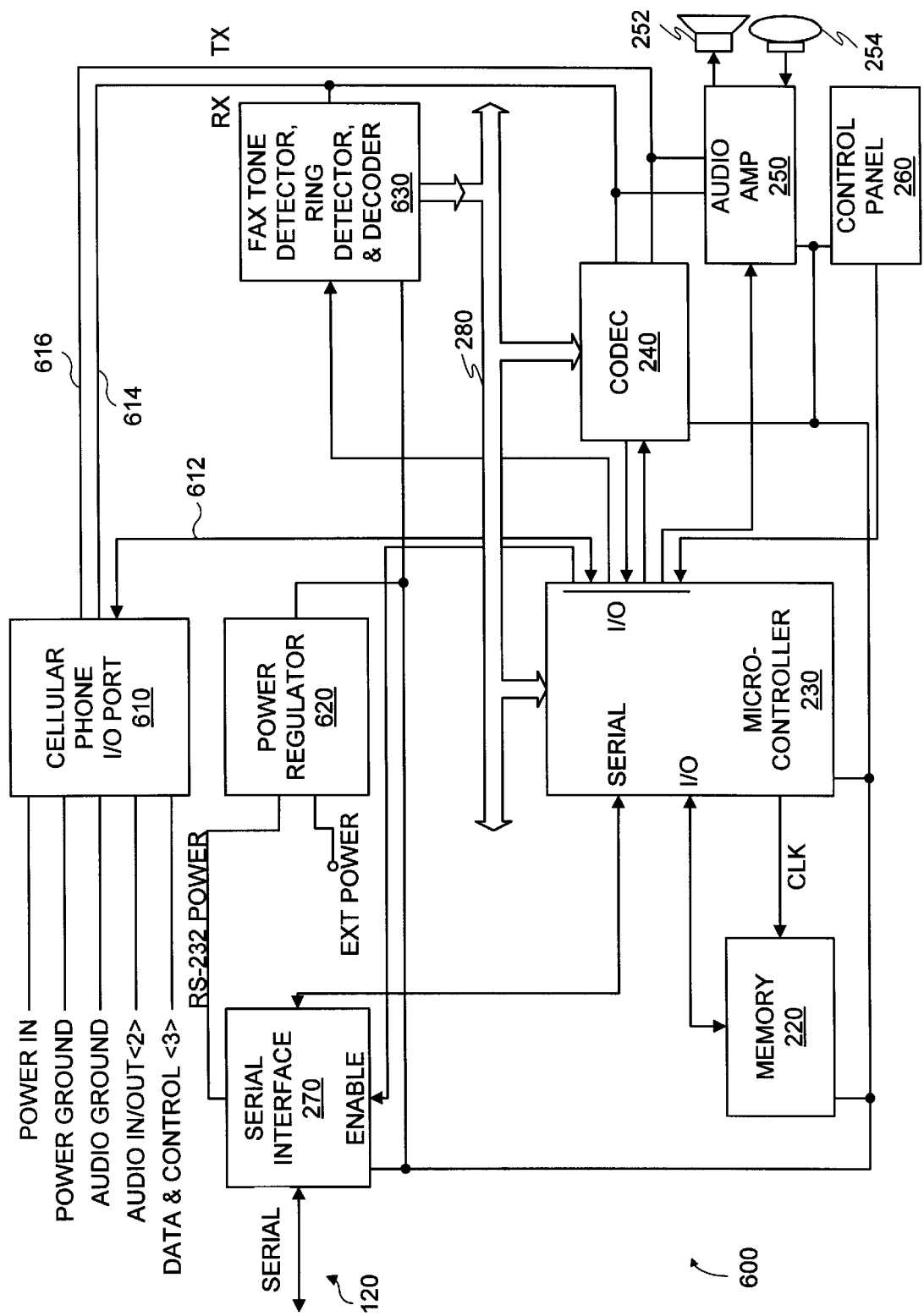
FIG. 6 is a block schematic diagram of another embodiment of a recording device in accordance with the present invention.

FIG. 5 shows an embodiment of a recording device 530 designed for use with a mobile telephone 510. The recording device 530 is similar to the recording device 200, with some exceptions that are dependent on the type of mobile telephone with which it is used. For example, FIG. 6 shows an illustrative architecture of a recording device 600 suitable for use with an analog flip-type cellular telephone available from Motorola, Inc. of Schaumburg, Ill., although it will be appreciated that the recording device 600 may be easily modified to work with a variety of different types of mobile telephones. While many components of the recording device 600 are the same as the recording device 200 of FIG. 2, the telephone line interface 210 of the recording device 200 is not used. Instead, the ring detection function is built into the fax tone detector, ring detector, and decoder 630. Ring detection in a cellular telephone differs from ring detection in a standard telephone in that a cellular telephone produces less than about one volt of ring signal. Moreover, the RX and TX lines to/from the CODEC 240 are directed to a cellular telephone I/O port 610 over lines 614 and 616 for, respectively, audio input from the cellular telephone and audio output to the cellular telephone. For cellular telephones having headset jacks, lines 614 and 616 may, if desired, be directed to a connector suitable for the headset jacks. I/O ports of the microcontroller 230 are connected over lines 612 (three lines) to data and control pins of the cellular telephone I/O port 610. Audio ground and power ground are connected to the reference potential (not shown) of the recording device 600. The power in pin of the cellular phone I/O port 610 may be used for a Motorola cellular telephone, if desired, to place the telephone in a "hands free" mode, thereby improving the signal-to-noise ratio of the received signal. A power regulator 620 selects between RS-232 power from the serial interface 270 and external power. External power is obtained from either a dedicated battery, the accessories port of the mobile telephone (if power is available), a direct tap into the powerpack of the mobile telephone using any suitable connector, or a combination of the foregoing. The low power design means that the recording device 600 can be powered from the power supply of the mobile telephone with only negligible impact on the lifetime of the mobile telephone power supply. Where facsimile reception and storage is not desired, the facsimile related circuits can be omitted from the recording device 600 with the benefit of further reducing power consumption. Where the recording device 600 is provided with a dedicated battery, it also conveniently serves as a dictation and conference recorder whether removed from or attached to the mobile telephone. It will be appreciated that packaging and connectivity requirements also are dependent on the type of mobile telephone with which the recording device 600 is used.

The description of the invention set forth herein is illustrative, and does not limit the scope of the invention as set forth in the following claims. Variations and modifications of the embodiments disclosed herein may be made based on the description set forth herein, without departing from the scope and spirit of the invention as set forth in the following claims.

What is claimed is:

1. A method of receiving a facsimile message using a host processor, comprising:

detecting an incoming analog facsimile transmission to obtain an analog signal containing the message;

digitizing the analog signal to obtain a digital representation thereof;

storing the digital representation in a digital memory;

furnishing the digital representation from the digital memory to the host processor; and reconstruction the message from the digital representation using the host processor.

2. A method as in claim 1 wherein the furnishing step comprises furnishing the digital representation from the digital memory to the host processor through a connector, the memory being a component of a first system, the host processor being a component of a second system, the first and second systems being distinct from one another, and the second system being a powered system furnishing power to the connector, further comprising:

obtaining power from an off-hook telephone line to carry out the detecting, digitizing and storing steps in the first system; and obtaining power from the connector to carry out the furnishing step in the first system.

3. A method as in claim 1 wherein the furnishing step comprises furnishing the digital representation from the memory to the host processor through a powered connector, the digital memory being a component of a first system, the host processor being a component of a second system, the first and second systems being distinct from one another, and the second system being a powered system furnishing power to the connector, further comprising:

obtaining power from a mobile telephone to carry out the detecting, digitizing and storing steps in the first system; and obtaining power from the connector to carry out the furnishing step in the first system.

* * * * *